United States Patent
Peng et al.

(10) Patent No.: US 12,076,712 B2
(45) Date of Patent: Sep. 3, 2024

(54) AQUEOUS EFFLUENT TREATMENT SYSTEM

(71) Applicant: ECOLE POLYTECHNIQUE FEDERALE DE LAUSANNE (EPFL), Lausanne (CH)

(72) Inventors: Gael Peng, Bussigny-Lausanne (CH); Frederic Juillard, Lausanne (CH); Jeremy Luterbacher, Chavannes-Renens (CH); Raquel Zambranovarela, Lausanne (CH); Lionel Bertschy, Belfaux (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 463 days.

(21) Appl. No.: 17/431,902

(22) PCT Filed: Feb. 24, 2020

(86) PCT No.: PCT/EP2020/054800
§ 371 (c)(1),
(2) Date: Aug. 18, 2021

(87) PCT Pub. No.: WO2020/173888
PCT Pub. Date: Sep. 3, 2020

(65) Prior Publication Data
US 2022/0111345 A1    Apr. 14, 2022

(30) Foreign Application Priority Data
Feb. 25, 2019 (EP) .................... 19159135

(51) Int. Cl.
*B01J 3/00* (2006.01)
*B01J 4/00* (2006.01)
*C02F 11/08* (2006.01)

(52) U.S. Cl.
CPC ............... *B01J 3/008* (2013.01); *B01J 4/008* (2013.01); *C02F 11/086* (2013.01);
(Continued)

(58) Field of Classification Search
None
See application file for complete search history.

(56) References Cited

U.S. PATENT DOCUMENTS 4,822,497 A * 4/1989 Hong ................. B01D 11/0203
                                                                    210/721
5,888,389 A    3/1999   Griffith
(Continued)

FOREIGN PATENT DOCUMENTS

| | | |
|---|---|---|
| JP | H1177089 | 3/1999 |
| JP | 3459749 | 10/2003 |

OTHER PUBLICATIONS

International Search Report and Written Opinion issued by the International Searching Authority, dated Apr. 3, 2020, for International Patent Application No. PCT/EP2020/054800; 16 pages.

*Primary Examiner* — Krishnan S Menon
(74) *Attorney, Agent, or Firm* — Faegre Drinker Biddle & Reath LLP

(57) ABSTRACT

Aqueous effluent treatment system including a separation reactor having a reactor chamber fluidly connected to an aqueous effluent source, connected via a pump to an inlet of the reactor chamber, a fluid extraction system connected to a liquid effluent outlet at a top of the reactor chamber, and a solid residue extraction system connected to a solid residue outlet at a bottom of the reactor chamber. The separation reactor is operable to generate pressures exceeding 22 MPa and temperatures exceeding 300° C. in the reactor chamber configured to generate a supercritical zone in an upper portion of the reactor chamber to which the liquid effluent outlet is connected, and a subcritical zone in a lower portion (Continued)

of the chamber within the reactor chamber to which the solid residue outlet is connected. The solid residue extraction system comprises an output circuit comprising a collector coupled to the solid residue outlet via a collector input valve (V1) and to a water output tank via a filter and a collector liquid output valve (V4) operable to be opened to cause a pressure drop at the solid residue outlet to draw solid residue out of the reactor chamber, the solid residue extraction system further comprising a gas feed circuit connected via a gas supply valve (V5) to the collector, the gas supply valve operable to be opened to extract solid residues in the collector to a solids output tank connected to the collector via a collector solids output valve (V6).

14 Claims, 9 Drawing Sheets

(52) U.S. Cl.
CPC .... *C02F 2201/005* (2013.01); *C02F 2209/02* (2013.01); *C02F 2209/03* (2013.01); *C02F 2301/066* (2013.01)

(56) References Cited

U.S. PATENT DOCUMENTS

| | | | |
|---|---|---|---|
| 10,941,355 B2* | 3/2021 | Coppola | C10G 27/00 |
| 2014/0296140 A1 | 10/2014 | Johnson | |
| 2015/0376042 A1 | 12/2015 | Mutoh | |
| 2017/0297941 A1* | 10/2017 | Wang | B01D 3/10 |
| 2018/0345241 A1* | 12/2018 | Hong | C10G 1/004 |

* cited by examiner

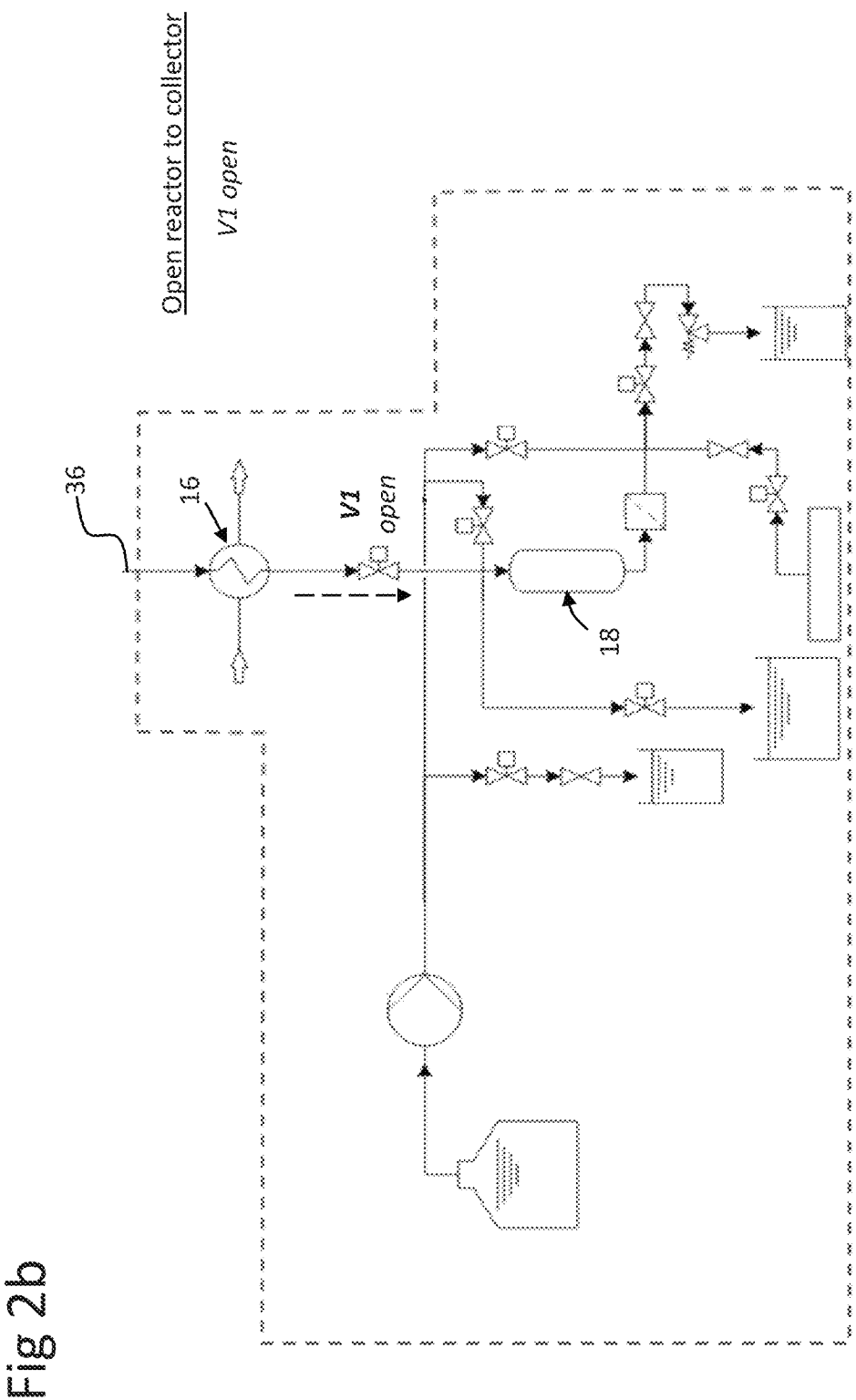

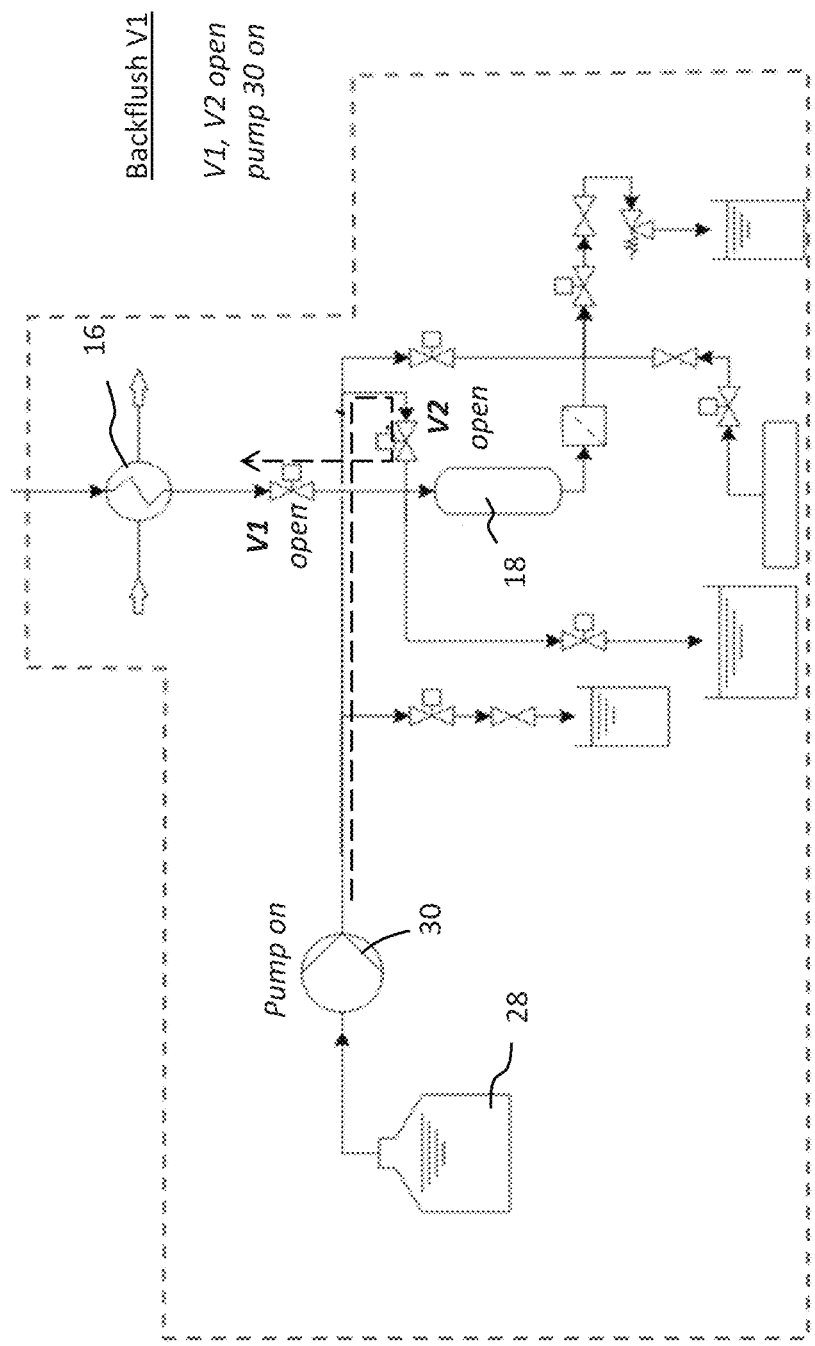

AQUEOUS EFFLUENT TREATMENT SYSTEM

CROSS-REFERENCE TO RELATED APPLICATIONS

The present application is a national stage entry of International (PCT) Patent Application Number PCT/EP2020/054800, filed Feb. 24, 2020, which in turn claims priority to European Patent Application No. 19159135.3, filed Feb. 25, 2019, the subject matter of which are expressly incorporated herein by reference.

The present invention relates to a system for treating aqueous effluent of various types, including for instance waste water that separates liquid effluent from solid residue.

In many conventional systems, municipal or domestic wastewater is transported via sewers to waste water treatment plants where the wastewater is initially screened to remove macroscopic particles and then treated with coagulants and/or flocculants. The wastewater is then sedimented to remove the clumped particles producing a contaminated water stream and a sewage stream. The contaminated water stream is subjected to oxidation and then filtered and released into the environment. The sewage stream can be anaerobically digested producing biogas, which can be either converted into heat and power using a combined heat and power system (CHP) or be injected in the natural gas grid. Currently, the residual digested sewage sludge is then dehydrated and transported either to an incinerator, landfill, or landspread.

Incineration results in the emission of particulates, acid gases ($CO_2$, HCl, HF, NOx, and $SO_2$), and volatile organic compounds. The material must be dehydrated prior to incineration (from 1-4 wt. % dry matter to 20-40 wt. %), stored on-site, transported to incinerators, and combusted with the assistance of an accelerant (usually natural gas). The cost of these measures can reach 40-50% of the operating expenses of the waste water treatment plant.

Currently, recovered sewage sludge is often either landfilled or converted into a nutrient rich compost for use in agriculture; however, increasing concentrations of micropollutants (e.g. polychlorinated biphenyls, organochlorine pesticides, biocides, UV filters, phthalates, etc.) and heavy metals have been found in the material, raising questions as the long term viability of those disposal methods.

Supercritical Water Separation (SCWS) presents as an attractive means for separating domestic sewage sludge into its organic and inorganic components. Economically viable solutions built on this concept should preferably operate in an essentially continuous manner and allow for the valorization of all components of the waste. The organic components can be effectively transformed to biogas using, for instance, a hydrothermal gasification unit, whereas the inorganic components can be valorized into fertilizers. Conventional reactor designs have demonstrated the feasibility of separating sewage sludge by SCWS; however, they suffer from clogging and corrosion due to the precipitation of insoluble inorganic compounds and the harsh reactor conditions.

Supercritical Water Separation (SCWS) may also be used for treating other aqueous effluents for instance coffee waste, microalgae, manure and various other waste products in an aqueous medium.

An object of the invention is to provide is an aqueous effluent treatment system that is durable and has a long life, yet separates liquid effluent from solid residue in an effective, efficient and economical manner.

It is advantageous to provide an aqueous effluent treatment system that can effectively, efficiently and economically separate inorganic compounds from organic compounds.

It is advantageous to provide an aqueous effluent treatment system that produces a high quality separation between organic and inorganic compounds.

It is advantageous to provide an aqueous effluent treatment system that enables the extraction of inorganic compounds with low energy consumption, especially in post-treatment processing.

It is advantageous to provide an aqueous effluent treatment system that is robust and is economical to operate and maintain.

Aqueous effluent may comprise waste water, or various other biological and non-biological waste and substances carried in an aqueous medium.

Objects of this invention have been achieved by providing the aqueous effluent treatment system according to claim 1, and the method of treating aqueous effluent according to claim 13.

Disclosed herein is an aqueous effluent treatment system including a separation reactor having a reactor chamber fluidly connected to an aqueous effluent source, connected via a pump to an inlet of the reactor chamber, a fluid extraction system connected to a liquid effluent outlet at a top of the reactor chamber, and a solid residue extraction system connected to a solid residue outlet at a bottom of the reactor chamber. The separation reactor is operable to generate pressures exceeding 22 MPa and temperatures exceeding 300° C. in the reactor chamber configured to generate a supercritical zone in an upper portion of the reactor chamber to which the liquid effluent outlet is connected, and a subcritical zone in a lower portion of the chamber within the reactor chamber to which the solid residue outlet is connected. The solid residue extraction system comprises an output circuit comprising a collector coupled to the solid residue outlet via a collector input valve and to a water output tank via a filter and a collector liquid output valve operable to be opened to cause a pressure drop at the solid residue outlet to draw solid residue out of the reactor chamber, the solid residue extraction system further comprising a gas feed circuit connected via a gas supply valve to the collector, the gas supply valve operable to be opened to extract solid residues in the collector to a solids output tank connected to the collector via a collector solids output valve.

In an embodiment, the gas feed circuit comprises a compressed gas source, preferably compressed air.

In an embodiment, the output circuit comprises a cooling system between the solid residue outlet of the separation reactor and the collector, the cooling system operable to cool the extracted solid residues to a temperature below 100° C.

In an embodiment, the solid residue extraction system comprises a water feed circuit connected via a collector valve to the collector, and comprising a pump operable to pump water from a water source into the collector at a pressure exceeding 22 MPa.

In an embodiment, the water feed circuit is connected to the collector input valve via a backflush valve operable to be opened to backflush the collector input valve with water.

In an embodiment, the water feed circuit is connected to a downstream depressurization water tank via an outlet valve operable to be opened to depressurize the collector.

In an embodiment, the water output tank is connected to the water source to recycle water collected in the water output tank to the water source of the water feed circuit.

In an embodiment, the collector liquid output valve is connected to a flow control valve to regulate water output flow from the collector.

In an embodiment, the output circuit comprises a pressure relief valve or a pressure regulator connected downstream of the collector liquid output valve, and upstream of the water output tank to regulate said pressure drop from the separation reactor to the water output tank.

In an embodiment, the collector comprises a tubular conduit wound in a plurality of spires or coil shape.

In an embodiment, a bottom wall of the reactor chamber has a funnel shape.

In an embodiment, the fluid extraction system comprises an output circuit including a cooling system and a gas/liquid separator downstream of the cooling system.

Also disclosed herein is a method of operating an aqueous effluent treatment system according to any of the preceding claims, comprising the steps of:

pressurization of the output circuit and collector of the solid residue extraction system by the water feed circuit, the pressure being regulated to be substantially equivalent to the pressure in the separation reactor;

connection of the reactor chamber to the solid residue extraction system by opening the collector input valve and transfer of the solid residue from the reactor chamber to the collector by creating a negative pressure gradient or by using gravitational force;

closing of the collector input valve and depressurization of the collector;

extraction of the solid residue from the collector to a solids output tank by applying pressurized gas from the gas feed circuit through the collector.

In an embodiment, the method further comprises back-flushing of the collector input valve with water prior to closing of the collector input valve by opening the backflush valve and operating the water feed circuit pump, the pressure of water pumped by the water feed circuit being set at a value higher than the pressure in reactor chamber.

In an embodiment, a pressure relief valve connected downstream of the collector liquid output valve is calibrated to open at a pressure in a range of 1 to 7 MPa lower than the pressure in the reactor chamber to create said negative pressure gradient for suction of the solid residue effluent out of the separation reactor chamber.

Advantageously, in an embodiment, during a filling of the collector with water, the collector valve V7 is open and any solid particles that are trapped in the filter are back-flushed with water.

The present invention advantageously combines an efficient supercritical water separation reactor with a semi-continuous inorganic precipitates extraction unit that allows for the continuous treatment of sewage sludge and the separation of the inorganic fraction as a solid residue (>90% recovery of inorganic minerals) from the organic (carbon) fraction in the form of a liquid effluent, or gas. Catalytic hydrothermal gasification may also be used to effectively convert the organic compounds of the liquid effluent into biogas.

Further objects and advantageous features of the invention will be apparent from the claims, from the detailed description, and annexed drawings, in which:

FIGS. 2a to 2g are schematic layout diagrams of a solid residue extraction system of an aqueous effluent treatment system, according to an embodiment of the invention, the FIGS. 2a to 2g illustrating different steps in a solid residue extraction process according to embodiments of the invention.

Figure 1A:
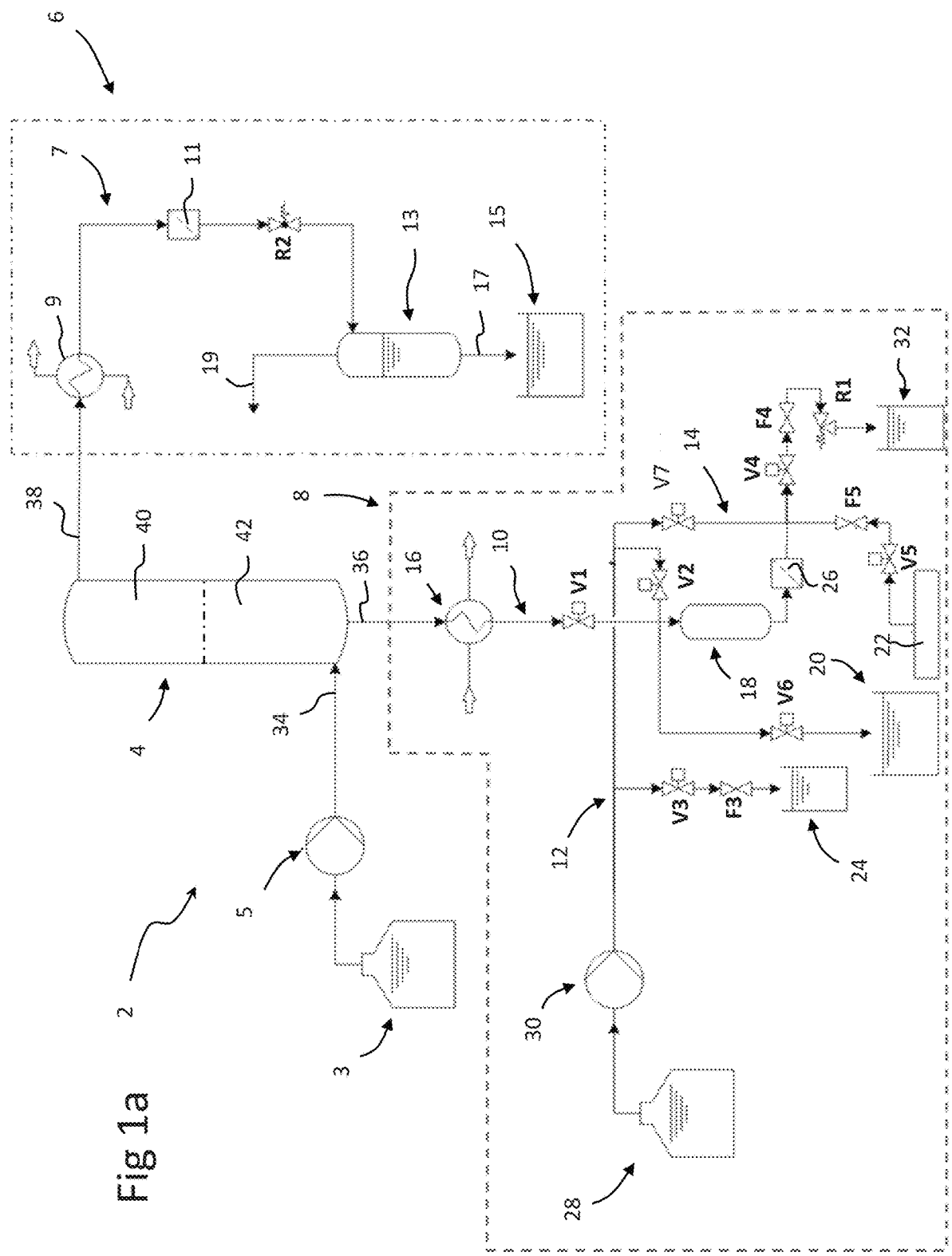
FIG. 1a is a schematic layout diagram of an aqueous effluent treatment system according to an embodiment of the invention.
Figure 1B:
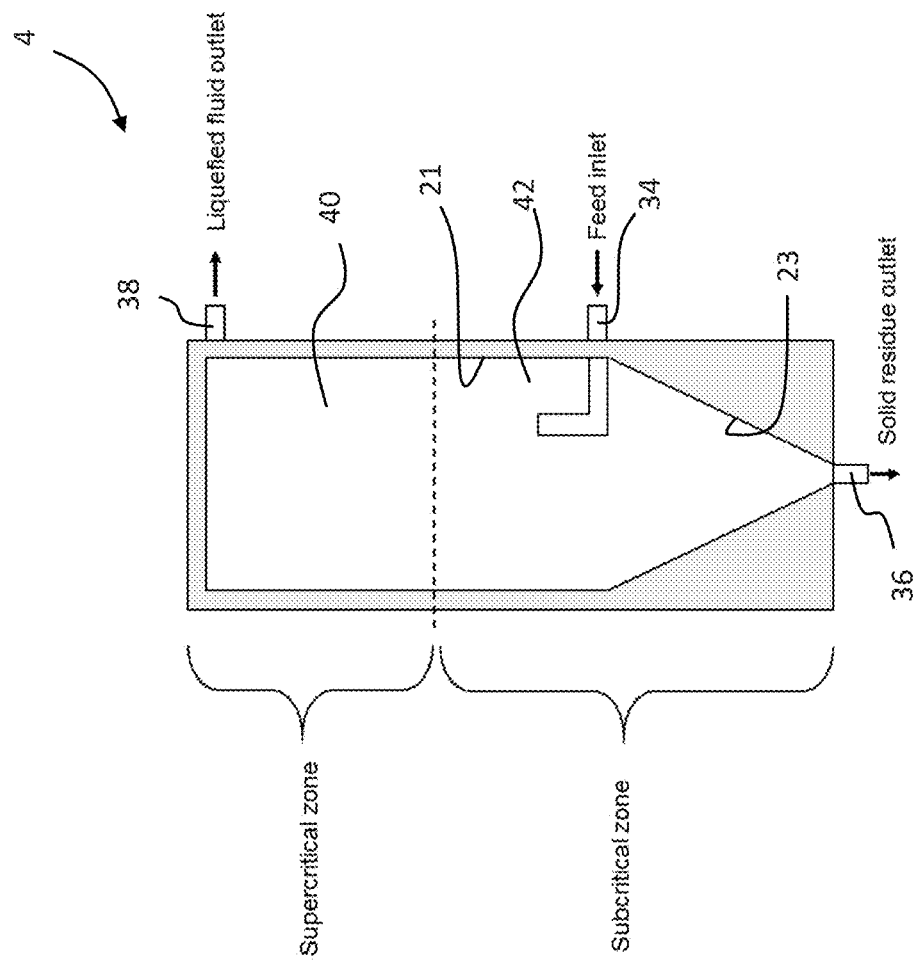
FIG. 1b is a schematic cross-sectional view of separation reactor of the system of FIG. 1a according to an embodiment of the invention.

Referring to the figures, starting with FIGS. 1a and 1b, an aqueous effluent treatment system 2 comprises a separation reactor 4 comprising a reactor chamber 21 fluidly connected to an aqueous effluent source 3, for instance a sewage source, connected via a pump 5 to an inlet 34 of the separation reactor, a fluid extraction system 6 connected to a liquid effluent outlet 38 of the separation reactor 4, and a solid residue extraction system 8 connected to a solid residue outlet 36 of the separation reactor 4. The aqueous effluent treatment system 2 may be used for the treatment of wastewater streams such as sewage sludge, manure, microalgae, industrial/domestic wastewater, and wastes from food industry. The aqueous effluent treatment system 2 is able to extract organic compounds as well as inorganic precipitates forming solid particles from a sub- and super-critical water phase (p>22.1 MPa, T>300° C.) to atmospheric pressure.

The separation reactor 4 is a high-pressure reactor operating at pressures exceeding 20 MPa and temperatures exceeding 300° C. in the reactor chamber 21 configured to generate a supercritical zone 40 in a first portion of the reactor chamber to which the liquid effluent outlet 38 is connected, and a subcritical zone 42 in a second portion of the reactor chamber 21 to which the solid residue outlet 36 is connected. Typically, the supercritical zone will be formed in an upper portion of the reactor chamber 21 and a subcritical zone formed in a lower portion of the reactor chamber 21, the separation between the supercritical and subcritical zones being defined by the temperature gradient within the reactor chamber. The formation of the temperature gradient in the separation reactor 4 to create a subcritical zone at the bottom of the reactor chamber and a supercritical zone at the top of the reactor chamber may be effected by employing heat exchange elements arranged along the reactor chamber, for instance as described in EP 3 245 165 B1.

As described in the afore-mentioned publication, the temperature gradient within the reactor chamber may be formed by thermal exchange units coupled to the reactor chamber at different positions within the chamber.

Contrary to the aforementioned know reactor design, the separation reactor of the present invention however comprises a solid residue outlet connected to a lower end of the chamber within the subcritical zone 42.

The aqueous effluent feed inlet 34 is preferably connected to the subcritical zone of the reactor chamber.

The solid residue outlet allows solid residues, in particular inorganic precipitates that collect during the extraction process to be extracted from the reactor chamber in a semi-continuous manner. The semi-continuous manner corresponds to extraction cycles in which the solid residue outlet is in liquid communication with the solid residue extraction system 8 to allow solid residues to flow out of the separation reactor and into the solid residue extraction system 8, interrupted by cycles in which the communication between the separation reactor and solid residue extraction system 8 is closed to allow residue to accumulate at the bottom of the chamber 21 of the separation reactor 4.

The feed from the source 3 is pumped by pump 5 into the separation reactor 4 via the feed inlet 34 at a pressure in excess of the pressure within the reactor chamber, which is at a pressure greater than 22.1 MPa. The pump 5 may advantageously be a high pressure piston pump. Inside the chamber of the separation reactor, the waste feed flows upward toward a supercritical zone, temperature in the supercritical zone being greater than 374° C. (T>374° C.).

The waste feed may be injected in the separation reactor upwards by the feed inlet 34 thanks to a standpipe. At the bottom of the reactor chamber 21, a funnel shape may be provided to ease the extraction of the inorganic precipitates out of the solid residue outlet 36.

Due to the low dielectric constant and low density of supercritical water, the supercritical zone acts as a barrier for inorganic compounds in the waste feed, whereas organic compounds dissolve well in the supercritical zone and may be extracted through the fluid effluent outlet 38 at the top of the chamber of the separation reactor 4.

The fluid extraction system 6 comprises an output circuit 7 including a cooling system 9 connected to the fluid effluent outlet 38 of the separation reactor 4, and downstream to a filter 11 and a gas/liquid separator 13. The gas/liquid separator 13 is connected on the one hand to a liquid outlet 17 and on the other hand to a gas outlet 19. The liquid outlet 17 is connected to a liquid effluent tank 15 to collect the liquid component of the fluid effluent. The gas outlet may be connected to a gas tank to collect the gaseous component of the fluid effluent.

The organic compounds rich fluid effluent is cooled down to about 50-60° C. by a cooling system 9. The pressure in the output circuit 7 connected to the separation reactor is maintained and controlled by a back-pressure regulator R2 positioned in the output circuit 7 downstream of the filter 11 which protects the regulator R2 from any solid particle waste, for instance coke, in the fluid effluent. The gas/liquid phase separator 13 allows to separate gas from the organic-rich liquid effluent which is finally collected in the liquid effluent tank 15.

Unlike the organic-rich liquid effluent, inorganic compounds in the waste feed precipitates, and by gravity fall to the bottom of the chamber of the separation reactor 4 and progressively accumulate at the bottom of the chamber.

The solid residue effluent collected at the bottom of the reactor chamber is extracted from the separation reactor in a semi-continuous manner by operation of the solid residue extraction system. The solid residue extraction system comprises an output circuit 10 coupled to the solid residue outlet 36 of the separation reactor, a high-pressure water feed circuit 12, and a gas feed circuit 14.

The output circuit 10 of the solid residue extraction system comprises a cooling system 16, a collector 18, a solids output tank 20 and a water output tank 32. The cooling system 16 is connected to the solid residue outlet 36 of the separation reactor that is arranged upstream of the cooling system 16, and to the collector 18 positioned downstream of the cooling system 16. The cooling system serves to cool the extracted solid residue effluent to a temperature preferably below 100° C. such that the solid residue extraction system can operate at temperatures lower than the boiling point of water at atmospheric pressure, reducing the thermal stresses and constraints on components of the solid residue extraction system.

The collector 18 is connected to the water output tank 32 via a filter 26 and a collector liquid output valve V4.

The collector 18 is connected to the solids output tank 20 via a collector solids output valve V6.

The collector 18 is further connected to the water feed circuit 12 via a collector valve V7 and the filter 26 on one hand, and also via a backflush valve V2.

The collector 18 is further connected to the gas feed circuit 14 via a gas supply valve V5 and the filter 26.

The filter 26 is configured to prevent particles of solid residue in the collector from flowing to the water output tank 32. The filter thus protects the flow control valve F4 and pressure relief valve R1.

The water feed circuit 12 comprises a water source 28 coupled to a high pressure pump 30 coupled to the collector valve V7, the backflush valve V2, and an outlet valve V3 connected to a downstream depressurization water tank 24.

The water output tank 32 may be connected to the water source tank 28 or, in a variant, form part of the same water tank.

The water output tank 32 receives water extracted from the separation reactor through the solid residue outlet 36 and collector 18.

The gas feed circuit 14 comprises a compressed gas source 22 connected via the gas supply valve V5 to the collector 18, the gas feed circuit serving to extract solid residues in the collector 18 to the solids output tank 20 during the solid residue extraction process.

The gas supply valve V5 may be coupled to a flow control valve F5 to regulate the flow of compressed gas, or the flow control valve may be integrated within the gas supply valve V5. The gas supply valve may for instance be in the form of a ball valve and the flow control valve 5 may for instance be in the form of a needle valve. The skilled person would however appreciate that various per se known valves that accomplish the functions of opening fluid communication between the gas source and the collector and that are able to regulate the flow may be used within the scope of this invention, such valves and flow regulation systems being per se well known in the art of pneumatic systems.

The gas feed circuit may be based on compressed air, for instance compressed air pumped into a compressed air tank, such systems being per se well known in the art of pneumatic systems. In the embodiments of the present invention, the compressed gas source is configured to supply gas preferably at a pressure greater that 2 bars, preferably greater than 3 bars, typically in a range of 2-5 bars.

The collector input valve V1, collector liquid output valve V4, outlet valve V3 of the water feed circuit 12, backflush valve V2, collector solids output valve V6, collector valve V7 and backflush valve V2, may each be in the form of ball valves, however other valve systems per se known in the art for hydraulic systems may be used without departing from the scope of the invention.

The collector liquid output valve V4 may in an embodiment be connected to a flow control valve F4 to regulate the water output flow from the collector 18 whereby the flow control valve F4 may be separate or integrally formed with the collector liquid output valve V4.

A pressure relief valve R1 may be coupled downstream of the collector liquid output valve V4, and upstream of the water output tank 32, the pressure relief valve R1 regulating the pressure drop from the separation reactor 4, across the collector 18, to the water output tank 32. The pressure drop controls the flow of solid residue effluent out of the separation reactor 4 into the collector 18.

It may be noted that instead of pressure relief valves implemented in the described embodiments, back-pressure regulators could be used.

In an advantageous embodiment, the collector 18 is in the form of a tubular conduit, for instance made of stainless steel, wound in a spire or coil shape, however the skilled person will appreciate that the collector 18 may comprise a conduit arranged in a serpentine or other shapes, or the collector may simply comprise a cylindrical vessel with a chamber to receive the solid residues.

Figure 2A:
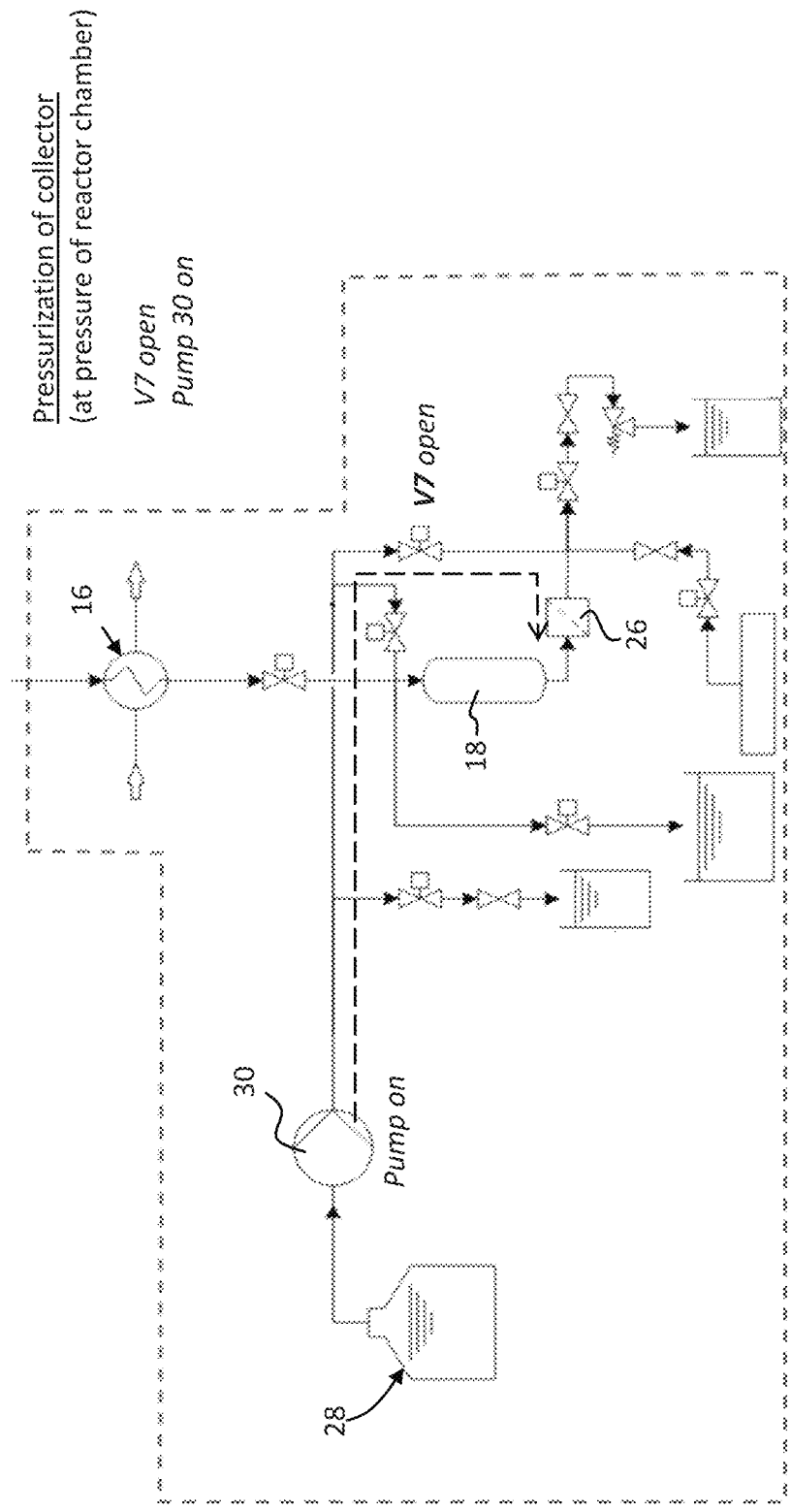

The extraction of the inorganic precipitates is realized by performing extraction cycles in a semi-continuous mode. A typical extraction cycle includes the following steps:

Referring to FIG. 2a, pressurization of the output circuit 10 and collector 18 by the water feed circuit 12 with water from a water source 28 by starting a high pressure pump 30 and opening the collector valve V7. At the end of the pressurization, the collector valve V7 is closed. The pressure is regulated to be substantially equivalent to the pressure in the separation reactor 4.

Referring to FIG. 2b, connection of the separation reactor 4 to the solid residue extraction system 8 is performed by opening collector input valve V1. This step is performed only if the pressure of the output circuit 10 is similar to the one of the separation reactor 4, which is ensured by the pressurization of the output circuit by the water feed circuit 12 mentioned above.

Figure 2C:
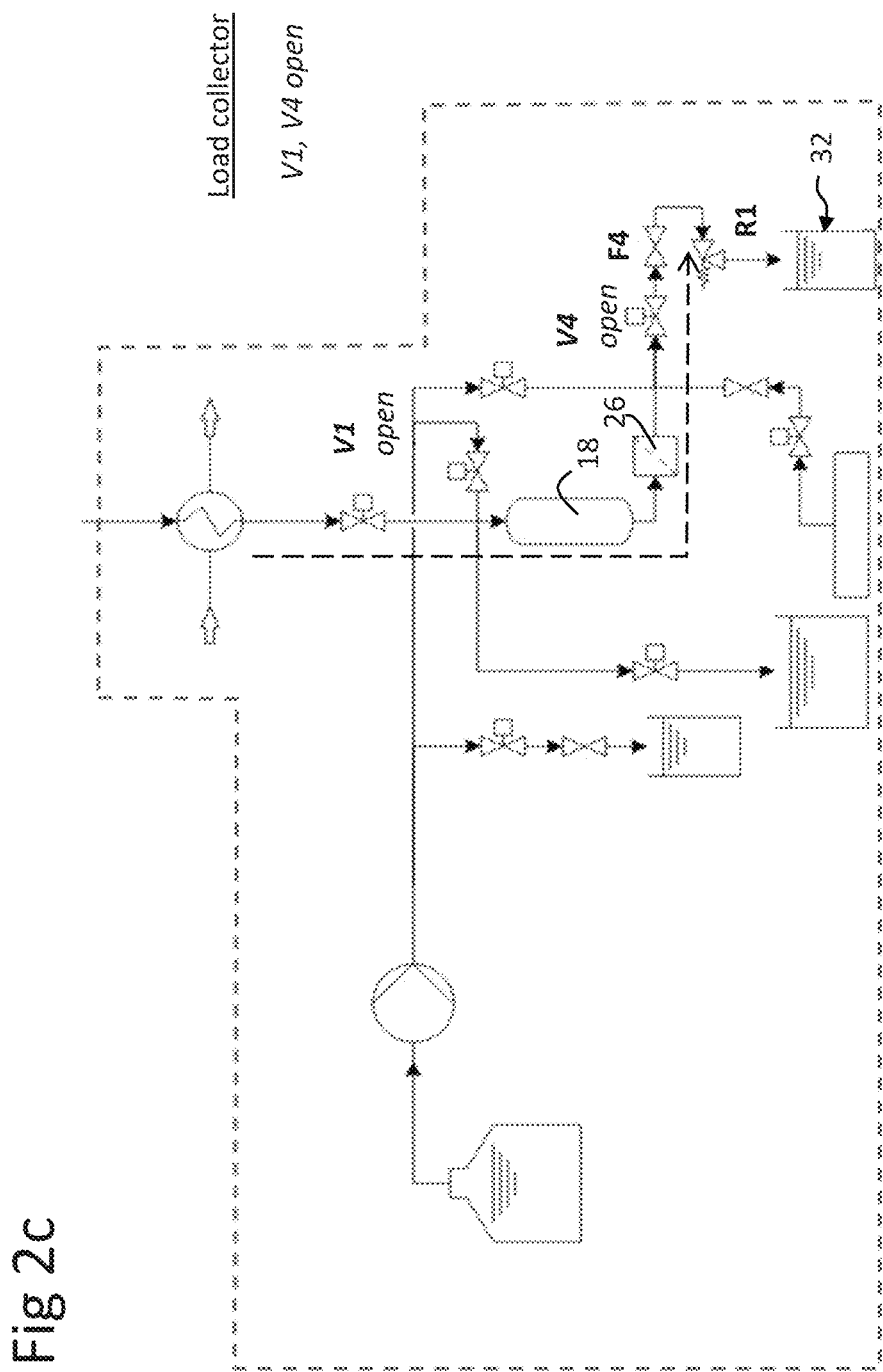

Referring to FIG. 2c, transfer of the solid residue effluent from the separation reactor to the collector 18 by creating a negative pressure gradient (suction). This is performed by opening a collector liquid output valve V4 which is connected to a flow control valve F4 and a pressure relief valve R1. The pressure relief valve R1 is calibrated to open at a lower pressure than the pressure in the reactor chamber 21, for instance around 1 to 7 MPa lower, thus creating a negative pressure gradient for suction of the solid residue effluent out of the separation reactor chamber 21. The pressure relief valve R1 may thus be calibrated to open at a pressure than around 15-21 MPa whereas the pressure in the reactor chamber is above about 22 MPa (more particularly above 22.1 MPa for supercritical water conditions), thus creating a negative pressure gradient for suction of the solid residue effluent out of the reactor chamber 21. The water which is collected during the suction is stored in the output water tank 32. A flow control valve F4 (e.g. a needle valve) may be located between the collector liquid output valve V4 and the pressure relief valve R1 in order to control (reduce) the flow velocity. A filter 26 is installed upstream of valves V4 and F4 for protecting them from any solid particles which could damage the valves by mechanical attrition. At the end of the suction process, collector liquid output valve V4 is closed.

In certain situations it may not be necessary to create a negative pressure gradient and gravity may be sufficient, for instance in case of large pipe diameter, to transport the solid residue to the collector 18.

Referring to FIG. 2d, back-flushing of the collector input valve V1 with water prior to closing it is performed. This step aims at cleaning the collector input valve V1 from any solid particles deposited during the transfer of solid residue. This is achieved by opening backflush valve V2 and starting water feed circuit pump 30 during a short time, for instance a few seconds. The flow rate and pressure of water pumped by the water feed circuit 12 is set at a value higher than the pressure in chamber of the separation reactor 4 in order to transport the solid particles upward toward the separation reactor 4.

An important parameter is the terminal velocity of the solid particles which allows to transport the solid particles. The latter depends on several parameters such as the density of the solid particles, particle sizes. Therefore in order to transport the solid particles out of the collector input valve V1, the fluid velocity inside the collector input valve V1 should be higher than the terminal velocity of the solid particles.

At the end of the cleaning step, the collector input valve V1 and water feed circuit backflush valve V2 are closed.

Figure 2E:
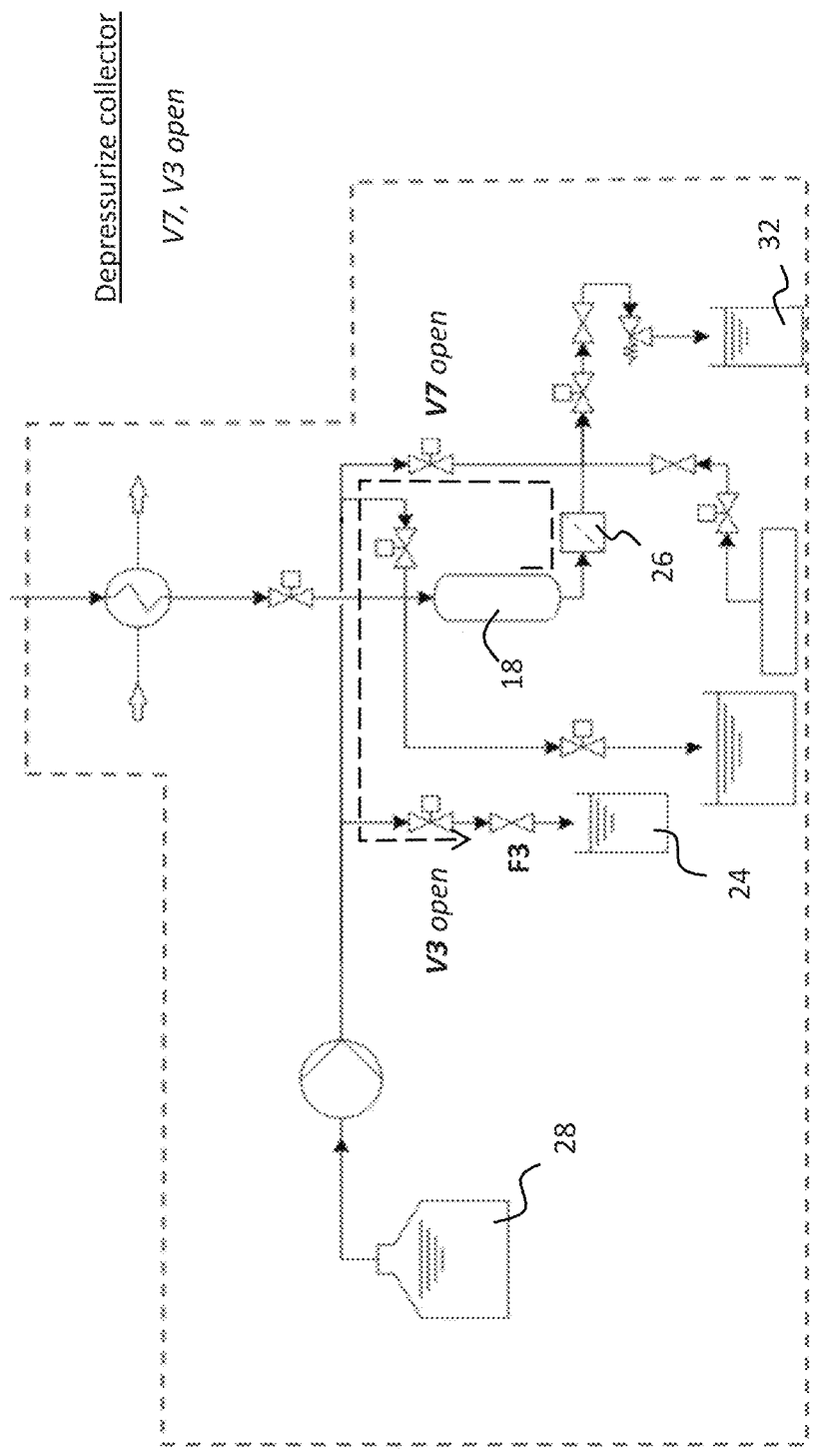

Referring to FIG. 2e, depressurization of the collector 18 is performed by opening the collector valve V7 and outlet valve V3. Outlet valve V3 may be connected to a flow control valve F3 which aims at smoothing the depressurization by lowering the flow velocity. The water obtained during the depressurization is collected in a water depressurization tank 24. At the end of the depressurization process, outlet valve V3 is closed. Since the collected water is clean, the latter could be reinjected in the water source tank 28 in order to be reused.

Figure 2F:
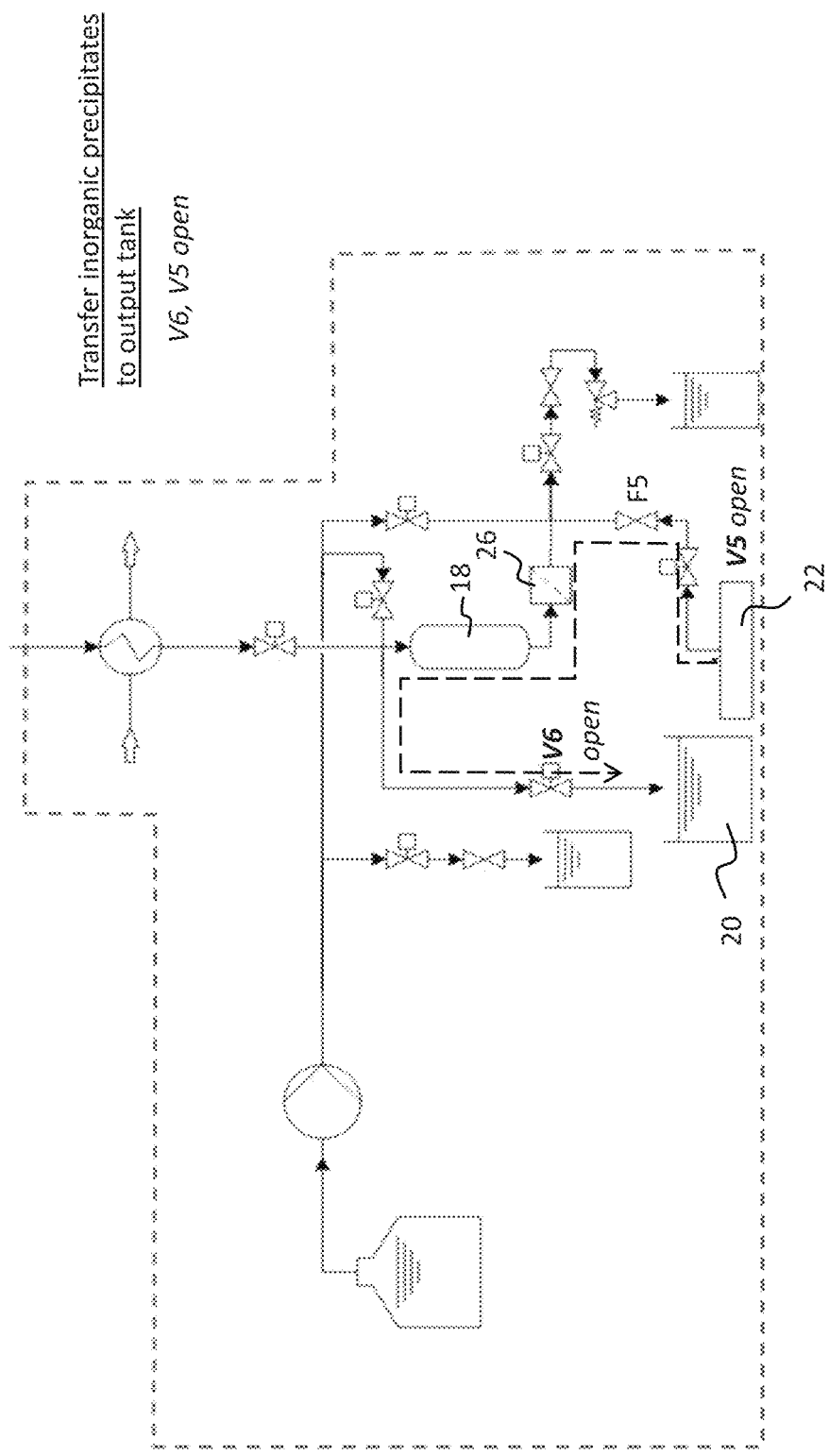

Referring to FIG. 2f, extraction of the solid residue (formed principally by inorganic precipitates) from the collector 18 to solids output tank 20 is performed by applying pressurized gas, preferably compressed air, from the gas feed circuit 14. This step is achieved by opening the gas supply valve V5 and the collector solids outlet valve V6. A flow control valve F5, for instance a needle valve, may be located downstream of gas supply valve V5 in order to control the flow of air. When all the solid residue inorganic precipitates are collected in the solids output tank 20, the air flow is stopped by closing gas supply valve V5.

Figure 2G:
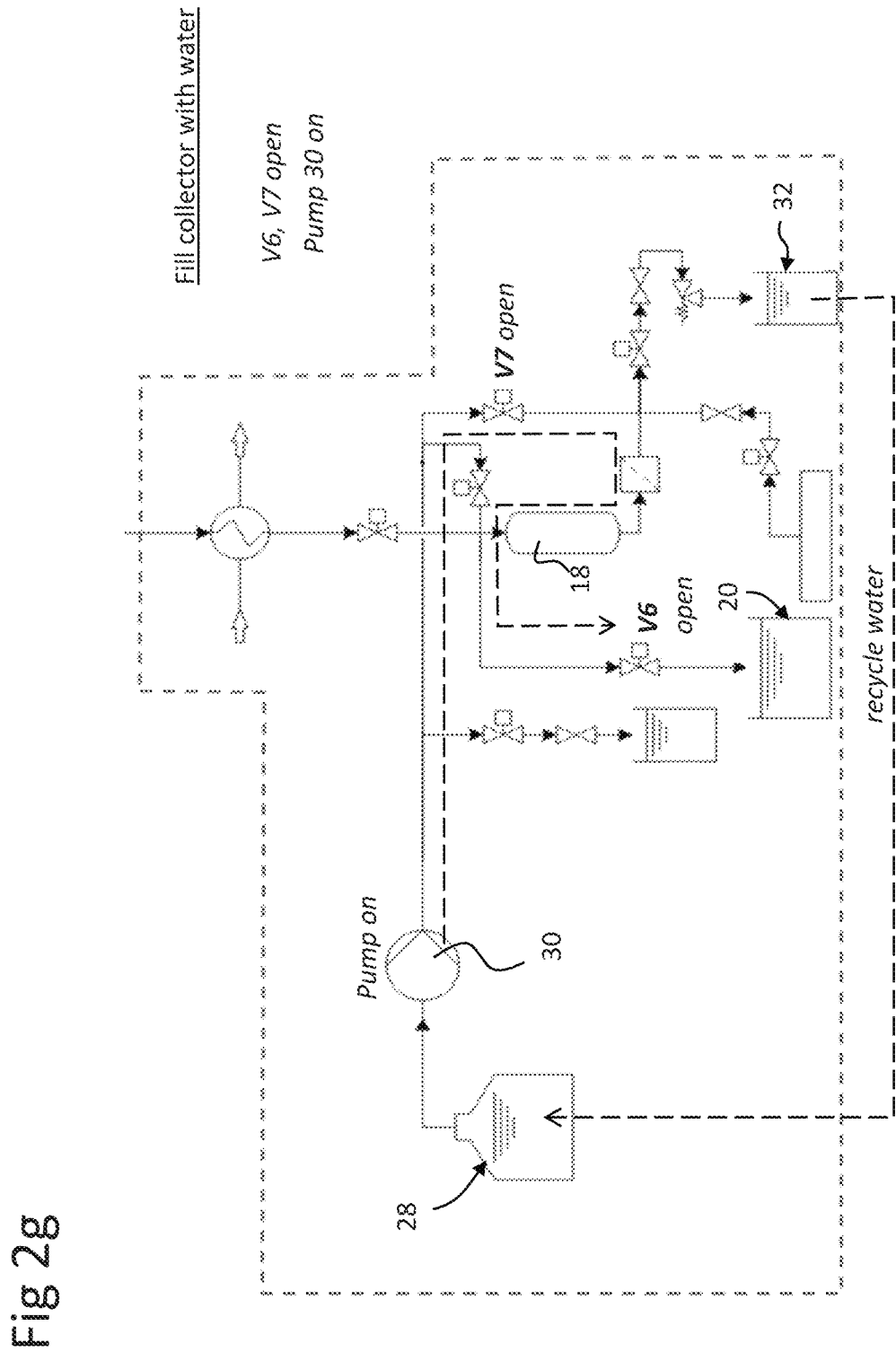

Referring to FIG. 2g, the collector 18 may then be refilled with water by starting water feed circuit pump 30. At the end of the extraction, the collector valve V7 and collector solids outlet valve V6 are closed. During the filling of the collector 18 with water, any solid particles that are trapped in the filter 26 can be back-flushed with water since the collector valve V7 is open. This operation advantageously provides an additional benefit of performing a back-flush of the filter 26 with water.

Advantageously, the solid residue extraction system 8 according to embodiments of the invention is configured such that no high pressure differences are created across the valves V1, V6, where the solid particles flow. This allows to protect the valves against mechanical attrition cause by the solid particle flow. The principal pressure difference in the output circuit 10 is created downstream of filter 26 where no solid particles are present.

Advantageously, in an embodiment, the collector may comprise a coil or serpentine structure of tube whose length can be adjustable, for instance by changing the number of spires or windings, according to the amount of inorganic precipitates to extract, thus making it easy to scale the solid residue extraction system 8 according to needs.

Advantageously, in an embodiment, water collected in the water output tank 32 during the solid residue extraction process can be recycled back in the water source tank 28 of the water feed circuit 12 and used for refilling the collector 18. Note that the amount of water sucked corresponds substantially to the amount of water which has to be fed for refilling the collector.

Advantageously, pressurized gas is used for flushing the solid residue out of the collector 18 which avoids diluting the solid residue effluent.

LIST OF REFERENCES USED

Wastewater treatment system 2
Waste feed (e.g. sewage) source 3
Pump 5
  e.g. piston pump
Separation reactor 4
  Reactor chamber 21
    Funnel shape bottom 23
    Waste feed inlet 34

Solid residue outlet 36
Fluid effluent outlet 38
Supercritical zone 40
Subcritical zone 42
Fluid extraction system 6
(Organic compound extraction system 6)
　Output circuit 7
　Cooling system 9
　Filter 11
　Pressure regulator R2
　Gas/liquid separator 13
　　Liquid outlet 17
　　Gas outlet 19
　Liquid effluent tank 15
Solid residue extraction system 8
(Inorganic compounds extraction system 8)
　Output circuit 10
　　Cooling system 16
　　Collector input Valve V1
　　Collector 18
　　　Filter 26
　　Collector liquid output Valve V4
　　Flow control valve F4
　　Pressure relief valve R1
　　Collector solids outlet valve V6
　　Solids output tank 20
　　(Inorganic compounds output tank 20)
　　Water output tank 32
　Water feed circuit 12
　　Water source 28
　　Pump 30
　　　e.g. HPLC pump
　　Outlet valve V3
　　Flow control valve F3
　　Collector valve V7
　　Backflush valve V2
　　Depressurization water tank 24
　　　Water
　Gas feed circuit 14
　　Compressed gas source 22
　　Gas supply Valve V5
　　Flow control valve F5

The invention claimed is:

1. Aqueous effluent treatment system including a separation reactor having a reactor chamber fluidly connected to an aqueous effluent source, connected via a pump to an inlet of the reactor chamber, a fluid extraction system connected to a liquid effluent outlet at a top of the reactor chamber, and a solid residue extraction system connected to a solid residue outlet at a bottom of the reactor chamber, wherein the separation reactor is operable to generate pressures exceeding 22.1 MPa and temperatures exceeding 374° C. in the reactor chamber configured to generate a supercritical zone in an upper portion of the reactor chamber to which the liquid effluent outlet is connected, and a subcritical zone in a lower portion of the chamber within the reactor chamber to which the solid residue outlet is connected, and wherein the solid residue extraction system comprises an output circuit comprising a collector coupled to the solid residue outlet via a collector input valve (V1) and to a water output tank via a filter and a collector liquid output valve (V4) operable to be opened to cause a pressure drop at the solid residue outlet to draw solid residue out of the reactor chamber, the solid residue extraction system further comprising a gas feed circuit connected via a gas supply valve (V5) to the collector, the gas supply valve operable to be opened to extract solid residues in the collector to a solids output tank connected to the collector via a collector solids output valve (V6), wherein the solid residue extraction system comprises a water feed circuit connected via a collector valve (V7) to the collector, and comprising a pump operable to pump water from a water source into the collector at a pressure exceeding 22.1 MPa.

2. System according to claim 1, wherein the gas feed circuit comprises a compressed gas source, preferably compressed air.

3. System according to claim 1, wherein the output circuit comprises a cooling system between the solid residue outlet of the separation reactor and the collector, the cooling system operable to cool the extracted solid residues to a temperature below 100° C.

4. System according to claim 1, wherein the water feed circuit is connected to the collector input valve (V1) via a backflush valve (V2) operable to be opened to backflush the collector input valve with water.

5. System according to claim 4, wherein the water feed circuit is connected to a downstream depressurization water tank via an outlet valve (V3) operable to be opened to depressurize the collector.

6. System according to claim 1, wherein the water output tank is connected to the water source to recycle water collected in the water output tank to the water source of the water feed circuit.

7. System according to claim 1, wherein the collector liquid output valve (V4) is connected to a flow control valve (F4) to regulate water output flow from the collector.

8. System according to claim 1, wherein the output circuit comprises a pressure relief valve (R1) or a pressure regulator connected downstream of the collector liquid output valve (V4), and upstream of the water output tank to regulate said pressure drop from the separation reactor to the water output tank.

9. Aqueous effluent treatment system including a separation reactor having a reactor chamber fluidly connected to an aqueous effluent source, connected via a pump to an inlet of the reactor chamber, a fluid extraction system connected to a liquid effluent outlet at a top of the reactor chamber, and a solid residue extraction system connected to a solid residue outlet at a bottom of the reactor chamber, wherein the separation reactor is operable to generate pressures exceeding 22.1 MPa and temperatures exceeding 374° C. in the reactor chamber configured to generate a supercritical zone in an upper portion of the reactor chamber to which the liquid effluent outlet is connected, and a subcritical zone in a lower portion of the chamber within the reactor chamber to which the solid residue outlet is connected, and wherein the solid residue extraction system comprises an output circuit comprising a collector coupled to the solid residue outlet via a collector input valve (V1) and to a water output tank via a filter and a collector liquid output valve (V4) operable to be opened to cause a pressure drop at the solid residue outlet to draw solid residue out of the reactor chamber, the solid residue extraction system further comprising a gas feed circuit connected via a gas supply valve (V5) to the collector, the gas supply valve operable to be opened to extract solid residues in the collector to a solids output tank connected to the collector via a collector solids output valve (V6), wherein the collector comprises a tubular conduit wound in a plurality of spires or coil shape.

10. System according to claim 1, wherein a bottom wall of the reactor chamber has a funnel shape.

11. System according to claim 1, wherein the fluid extraction system comprises an output circuit including a cooling system and a gas/liquid separator downstream of the cooling system.

12. Method of operating an aqueous effluent treatment system according to claim 1, comprising the steps of:
pressurization of the output circuit and collector of the solid residue extraction system by the water feed circuit, the pressure being regulated to be substantially equivalent to the pressure in the separation reactor;
connection of the reactor chamber to the solid residue extraction system by opening the collector input valve (V1) and transfer of the solid residue from the reactor chamber to the collector by creating a negative pressure gradient or by using gravitational force;
closing of the collector input valve (V1) and depressurization of the collector;
extraction of the solid residue from the collector to a solids output tank by applying pressurized gas from the gas feed circuit through the collector.

13. Method according to claim 12, further comprising back-flushing of the collector input valve (V1) with water prior to closing of the collector input valve (V1) by opening the backflush valve (V2) and operating the water feed circuit pump, the pressure of water pumped by the water feed circuit being set at a value higher than the pressure in reactor chamber.

14. Method according to claim 12, wherein a pressure relief valve (R1) connected downstream of the collector liquid output valve (V4) is calibrated to open at a pressure in a range of 1 to 7 MPa lower than the pressure in the reactor chamber to create said negative pressure gradient for suction of the solid residue effluent out of the separation reactor chamber.

* * * * *